(12) United States Patent
Villani (10) Patent No.: US 10,831,644 B2
(45) Date of Patent: Nov. 10, 2020

(54) AUTOMATION OF ENTERPRISE SOFTWARE INVENTORY AND TESTING

(71) Applicant: Villani Analytics LLC, Yonkers, NY (US)

(72) Inventor: Daniel Villani, Yonkers, NY (US)

( * ) Notice: Subject to any disclaimer, the term of this patent is extended or adjusted under 35 U.S.C. 154(b) by 0 days.

(21) Appl. No.: 16/148,617

(22) Filed: Oct. 1, 2018

(65) Prior Publication Data

US 2020/0104242 A1   Apr. 2, 2020

(51) Int. Cl.
*G06F 9/44* (2018.01)
*G06F 11/36* (2006.01)
*G06F 8/73* (2018.01)

(52) U.S. Cl.
CPC ............ *G06F 11/3684* (2013.01); *G06F 8/73* (2013.01)

(58) Field of Classification Search
CPC ..... G06F 8/61; G06F 8/65; G06F 8/71; G06F 13/00
See application file for complete search history.

(56) References Cited

U.S. PATENT DOCUMENTS

| | | | | |
|---|---|---|---|---|
| 6,799,145 B2* | 9/2004 | Kennedy | ............. | G06F 11/3684 702/182 |
| 7,020,697 B1* | 3/2006 | Goodman | ............. | G06Q 10/10 709/223 |
| 9,329,841 B2* | 5/2016 | Chancey | ................... | G06F 8/36 |
| 10,481,893 B1* | 11/2019 | Righi | ......................... | G06F 8/63 |
| 2007/0234290 A1* | 10/2007 | Ronen | ....................... | G06F 8/36 717/120 |
| 2012/0324417 A1* | 12/2012 | Somani | ..................... | G06F 8/30 717/101 |
| 2013/0275958 A1* | 10/2013 | Ivanov | ...................... | G06F 8/61 717/174 |
| 2014/0181793 A1* | 6/2014 | Kaliappan | ........... | G06F 11/3672 717/124 |
| 2014/0380340 A1* | 12/2014 | Knichel | .................. | G06F 8/654 719/327 |
| 2015/0186125 A1* | 7/2015 | Avery | ....................... | G06F 8/61 717/174 |
| 2020/0050965 A1* | 2/2020 | Harvill | ..................... | G06K 9/00 |

* cited by examiner

*Primary Examiner* — Duy Khuong T Nguyen (57) ABSTRACT

Disclosed herein are system, method, and computer program product embodiments for automating component management in enterprise applications. An embodiment operates by receiving metadata associated with the enterprise application implementation and storing an inventory including at least a portion of the metadata. The system then determines one or more component dependencies of the enterprise application implementation based on the inventory and providing one or more recommendations for component installation or deletion based on the inventory and one or more component dependencies. The system also generates one or more testcases based on the inventory and the one or more component dependencies.

6 Claims, 8 Drawing Sheets

FIG. 8

AUTOMATION OF ENTERPRISE SOFTWARE INVENTORY AND TESTING

BACKGROUND

Technical Field

Embodiments generally relate to system and methods of managing enterprise software.

Background

Enterprise software, also known as enterprise application software (EAS), is a term generally used to describe computer software used to satisfy the needs of an organization rather than individual users. Such organizations may include businesses, schools, charities, government agencies, etc. Services provided by enterprise software are typically business-oriented tools, such as online shopping, online payment processing, interactive product catalogue, automated billing systems, security, Business Process Management, enterprise content management, IT service management, customer relationship management, enterprise resource planning, business intelligence, project management, collaboration, human resource management, manufacturing, occupational health and safety, enterprise application integration, and enterprise forms automation, among others.

As organizations look to streamline operations, they often implement enterprise applications to assist in aspects of their business. For example, some organizations implement enterprise performance management (EPM) solutions to assist with reporting and analysis, enterprise resource planning (ERP) solutions to assist in transaction storage and reporting, and master data management (MDM) solutions to house their master data in one central location. Many organizations purchase configurable applications from software vendors such as Microsoft®, Oracle®, SAP®, etc.

As enterprises have similar departments and systems in common, enterprise software is often available as a suite of customizable programs. Generally, the complexity of these tools requires specialist capabilities and specific knowledge. As such, maintaining components of an enterprise software implementation can be daunting task. A given implementation may include thousands of components with multiple dependencies, requiring administrators to create detailed inventories of these. Making changes or upgrades to the system may require careful implementation and testing to avoid system errors or failures, costing valuable organizational time and resources.

SUMMARY

Disclosed herein are system, method, and computer program product embodiments for automating component management in enterprise applications. An embodiment operates by receiving metadata associated with the enterprise application implementation and storing an inventory including at least a portion of the metadata. The system then determines one or more component dependencies of the enterprise application implementation based on the inventory and providing one or more recommendations for component installation or deletion based on the inventory and one or more component dependencies. The system also generates one or more testcases based on the inventory and the one or more component dependencies.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The accompanying drawings are incorporated herein and form a part of the specification.

DETAILED DESCRIPTION

Provided herein are system, method and/or computer program product embodiments, and/or combinations and sub-combinations thereof, for automating component management in enterprise applications.

Figure 1:
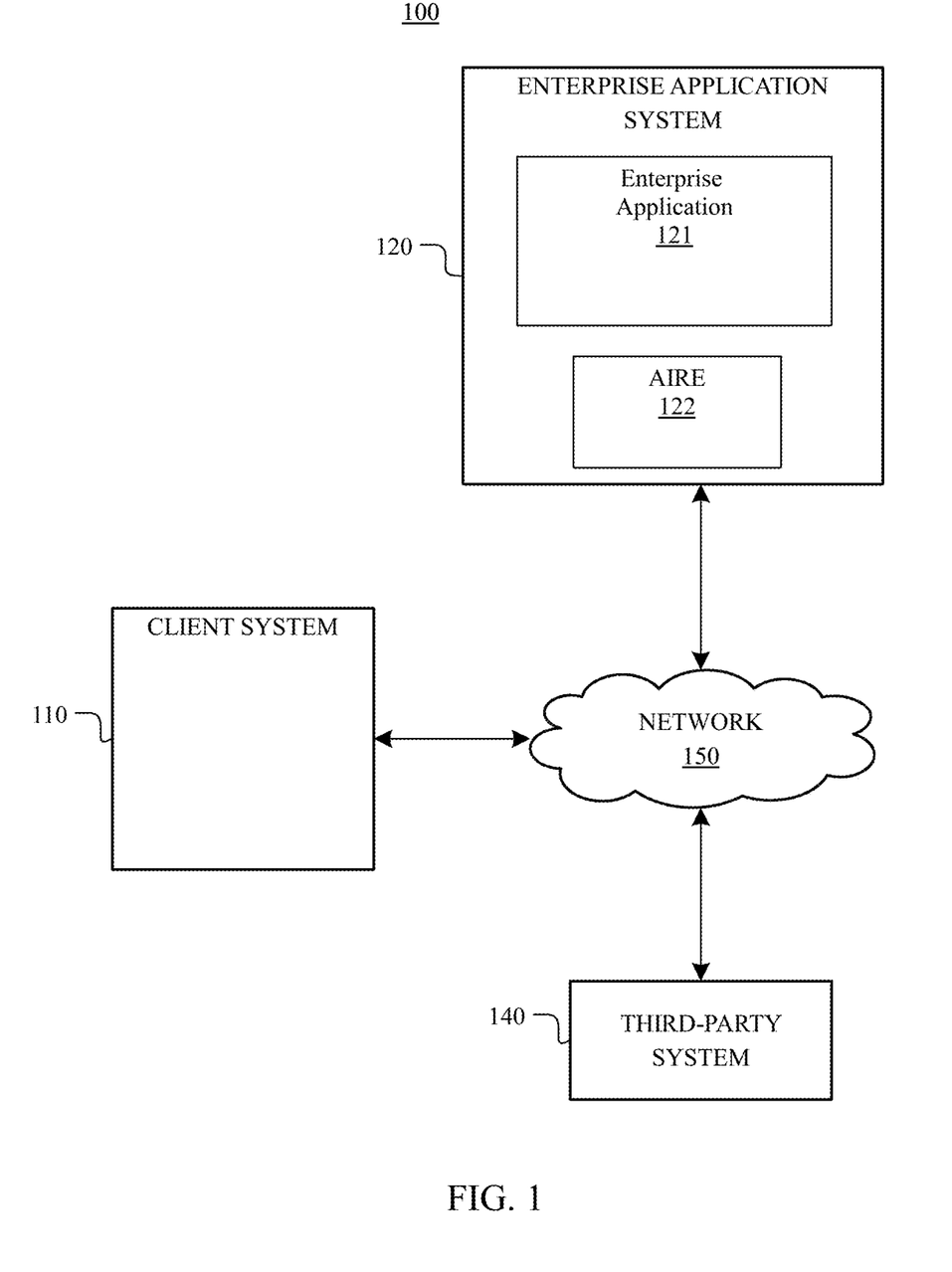
FIG. 1 illustrates an enterprise application system environment, according to an example embodiment.

FIG. 1 illustrates an enterprise application system environment 100, according to an example embodiment. One or more client systems 110 connects to one or more enterprise application servers 120 through a network 150. The one or more application servers 120 execute an implementation of an enterprise application 121. The network may be any communications network suitable for transmitting data between computing devices, such as, by way of example, a Local Area Network (LAN), a Wide Area Network (WAN), Metropolitan Area Network (MAN), Personal Area Network (PAN), the Internet, wireless networks, satellite networks, overlay networks, or any combination thereof. Client system 110 may be any computing device suitable for interacting with enterprise application server 120, such as, by way of example, a personal computer, mobile computer, laptop computer, mobile phone, smartphone, personal digital assistant, or tablet computer. Enterprise server 120 may be any computing device or combination of devices suitable to provide enterprise application services, such as, by way of example, server computers, database systems, storage area networks, web servers, application servers, or any combination thereof. A user of client system 110 may interact with enterprise server 120 through any suitable graphical user interface, such as, by way of example, an application, web browser, web application, mobile application, etc.

In particular embodiments, a system, method and/or computer program product embodiments perform automation of component management in enterprise applications. Particular embodiments implement an Application Intelligence & Recommendation Engine (AIRE) 122. While AIRE 122 is shown as running within enterprise server 120, AIRE 122 may be implemented locally at enterprise server 120, remotely at client system 110, on a third-party system 140, or any combination thereof. AIRE 122 may collect key information from the application 121 and use that information to build an inventory of all components in that application. Based on this inventory, AIRE may create detailed reporting and analytics related to the components. These reports may assist application administrators, end users, and auditors in understanding the various components that are part of the implementation. AIRE 122 may also create recommendations for improving the quality of the application 121 by detailing the dependencies of each application component and recommending test cases based on the objects that are being created and/or modified. AIRE 122 may further detect installed components that are not being used, for example, to recommend their removal. AIRE 122 may also create security reports to outline and track application provisioning over time in an effort to maintain regulatory compliance.

Figure 2:
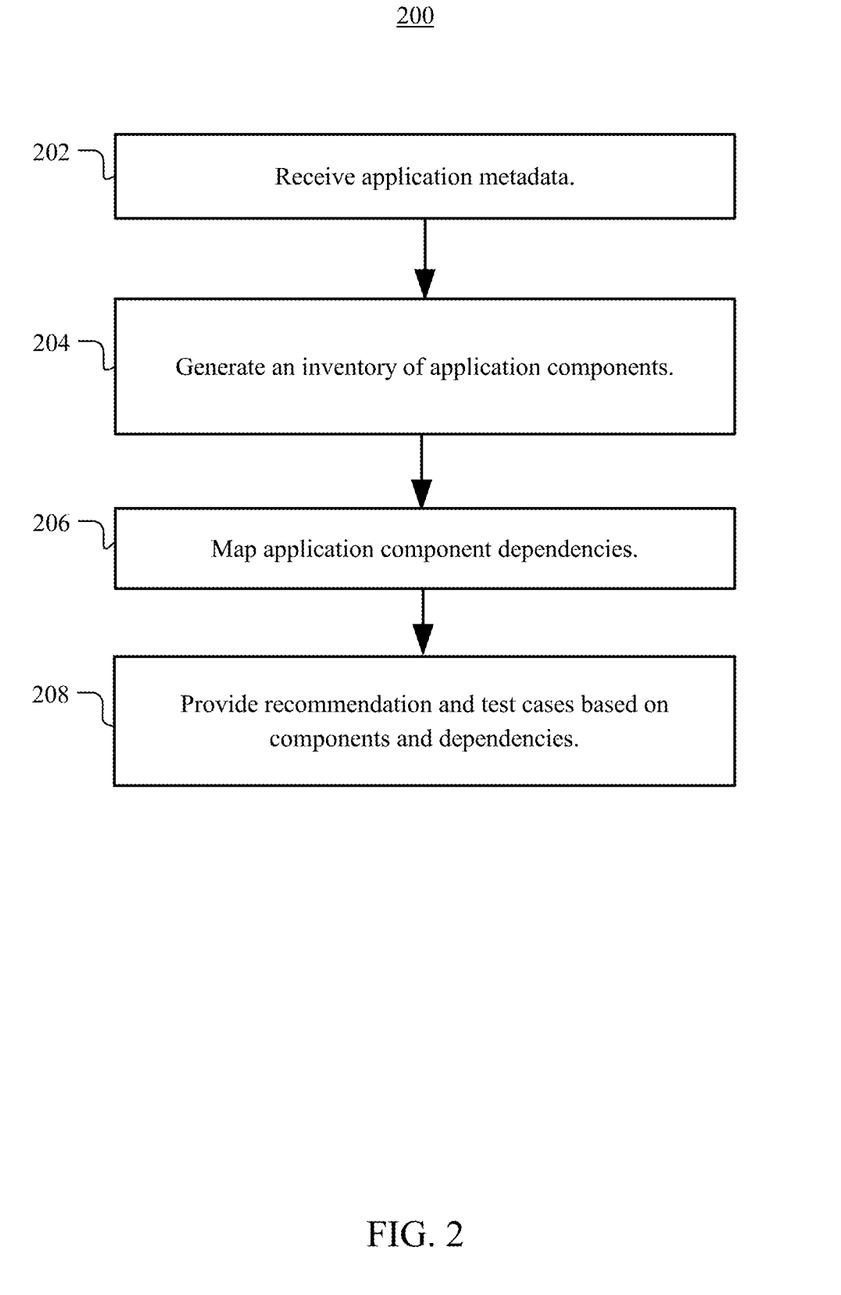
FIG. 2 is a flowchart for a method for automating component management in enterprise applications, according to an example embodiment.

FIG. 2 is a flowchart for a method 200 for automating component management in enterprise applications, according to an example embodiment. Method 200 can be performed by processing logic that can comprise hardware (e.g., circuitry, dedicated logic, programmable logic, microcode, etc.), software (e.g., instructions run on a processing device), or a combination thereof.

At step 202, AIRE 122 initiates and receives application 121 metadata. For example, a user can upload an application-generated file that contains application metadata. In another example, AIRE 122 communicates with the enterprise application implementation 121 through a network using an Application Programming Interface (API), thus connecting AIRE 122 to an enterprise application 121 to request and receive the metadata from the application 121. In another example, AIRE 122 may provide an API interface that other programs can use to access AIRE 122 functionalities as a software-as-a-service (SaaS) application. For example, AIRE 122 may be a cloud application controlled remotely through a first API, and which in turn may connect to a second API of an enterprise application 121.

Figure 3:
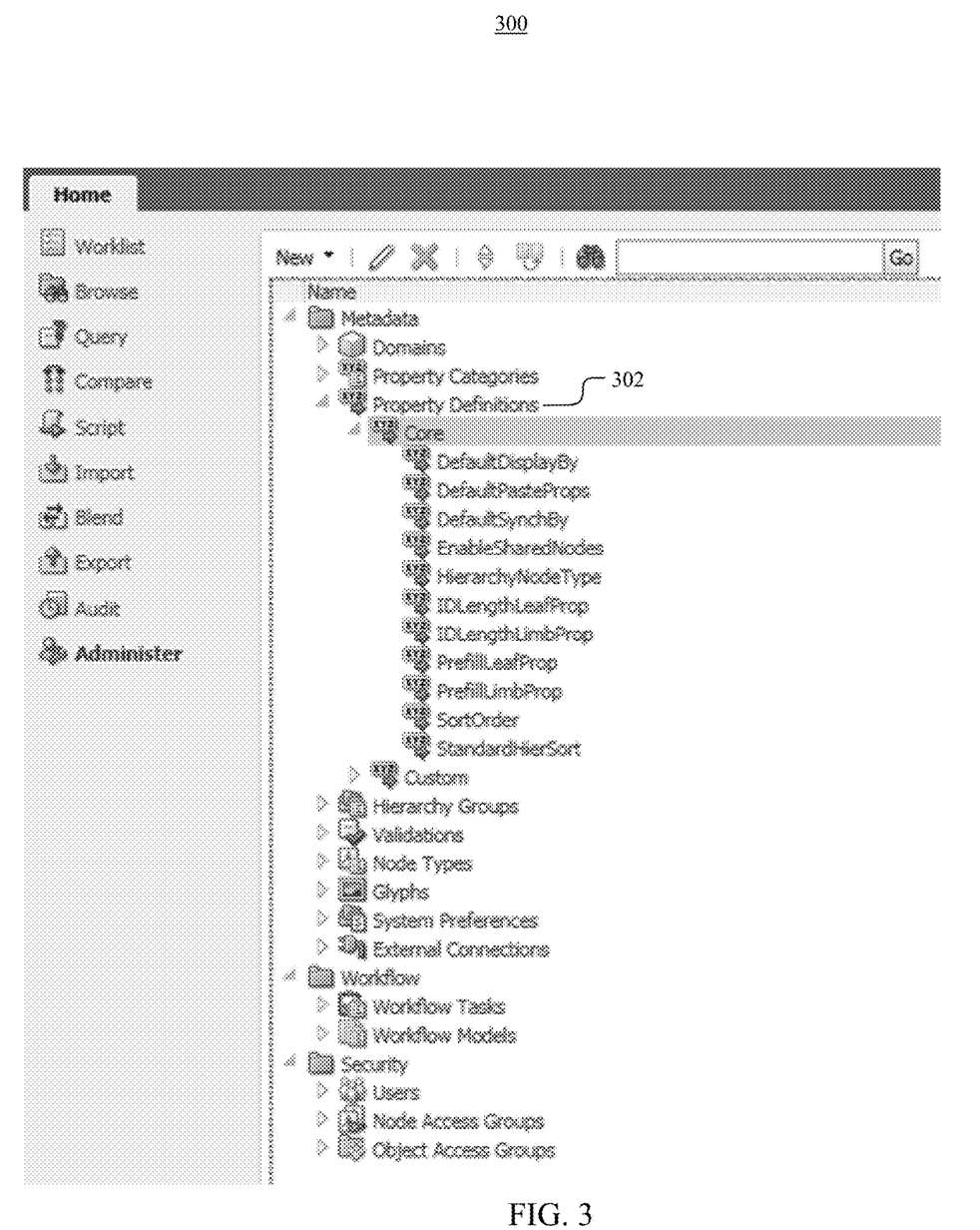
FIG. 3 shows a screenshot of a Master Data Management application, according to an example embodiment.

At step 204, AIRE 122 loads the metadata into a database and generates an inventory of application components and available security reports. This inventory may be used to generate the final reports delivered to the end user. Application components may be objects created within an enterprise application 121 to meet the needs of the organization or group that is using the software. FIG. 3 show a screenshot of a Master Data Management application 300 (e.g., Oracle® Data Relationship Management (DRM)), according to an example embodiment. Application 300 (i.e., an example of an enterprise application 121) may be a utility to manage hierarchies, mappings, and other master data for an organization. Within application 300, components 302 may include, by way of example, hierarchies, accounts, custom properties, custom validations, imports, exports, etc. A hierarchy, such as a chart of accounts, may be stored within the software and can be exported in a variety of different formats to be ingested by other target systems. An account may have different properties associated with it, like an account type (e.g., whether it's an asset, liability, revenue, expense, equity account, etc.). Custom properties can be created within the tool. Custom validations can be created to ensure property values meet specified criteria. Imports can be defined for managing data coming into the system from external sources. Exports can be defined to push data from application 300 to target systems.

At step 206, the software maps application component dependencies. In particular embodiments, the mapping of the component dependencies is provided to an end user, for example, so that the user may conduct management analysis determining what components impact other components in the application.

Figure 4:
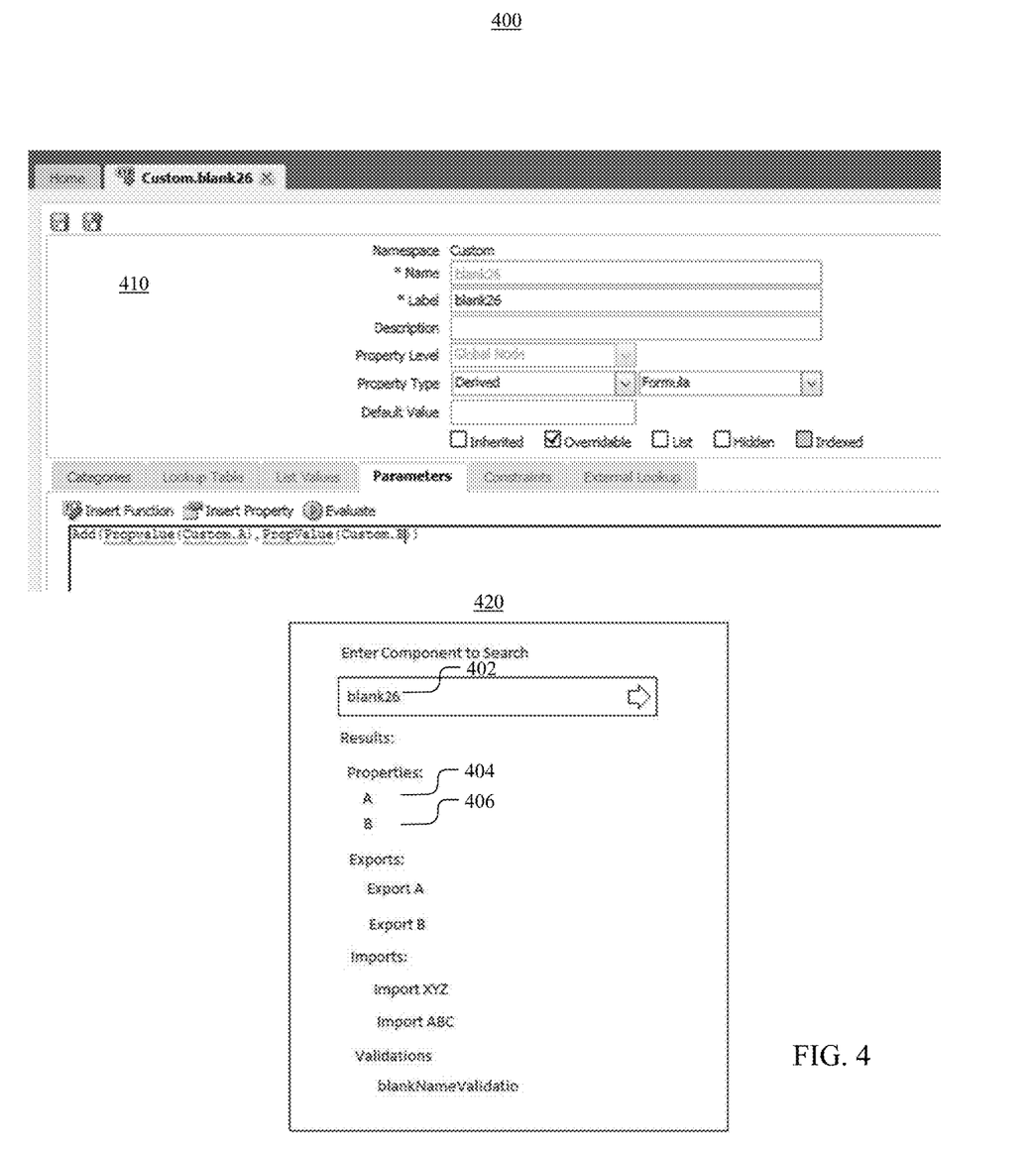
FIG. 4 shows an example of a property which is derived to be the addition of two properties, according to an example embodiment.

Component dependencies are relationships between application components. For example, many enterprise applications allow custom calculations within the application. Derived properties can be created that assign property values based on predetermined logic. In particular embodiments, AIRE 122 helps users determine dependencies when modifying or testing derived properties. FIG. 4 shows an example of a property 402 (e.g., "blank26") which is derived to be the addition of two properties 404 and 406 (e.g., "A" and "B"). An interface 410 may be used to create property 402 and define it as the sum of properties 404 and 406. Interface 410 may be provided, for example, by an administrator interface associated with the enterprise application. If an application administrator wanted to make a change to this logic in the future, he/she would have to look through the logic to determine what other properties are dependent on this one (in this example, A and B). Also, additional components may be dependent on these properties. For example, exports and imports may use properties when ingesting data into data management application 300 or pushing data out of it. Therefore, it can be difficult to see from one interface all the relevant dependencies.

In particular embodiments AIRE 122 provides an interface 420 for searching for dependencies, allowing a user to type in a component and view all components that reference the one searched. As shown in portion 420 of FIG. 4, a user may enter a component to search. AIRE 122 may then return a list of components that reference the component the user searched. This enables an impact analysis of any changes that need to occur in the system and reduces the risk that a change will cause an issue with another component. Interface 420 may also inform users of which test cases should be run to ensure all dependencies are adequately tested during the testing phase of the implementation.

At step 208, AIRE 122 may provide recommendations and testcases based on the components and dependencies. Based on the inventory, various recommendations may be provided to the end user. Test cases may be recommended to the end user based on the components that exist in the application. Recommendations may be also generated based on determining that existing components not in use, and are thus candidates for deletion. Conversely, AIRE 122 may also recommend new components for addition based on existing components. In particular embodiments, a report is created containing the created inventory, along with dependencies and recommendations.

In particular embodiments, AIRE 122 may further create reports regarding compliance with regulatory standards. Audit functions within organizations, as well as externally, exist to ensure compliance with regulatory standards as well as corporate standards. There are many regulatory standards that govern the operation of organizations. For example, the Sarbanes Oxley (SOX) rules require any System of Record (SOR) or System of Origin (SOO) to refrain from going live, in a production environment, with any changes in the final quarter of the year. In many applications it can be difficult to prove what changes have been made in the final quarter of the year. AIRE 122 may provide auditors with reports or other means of viewing changes over a specified period of time, ensuring compliance with applicable laws and regulations.

In particular embodiments, AIRE 122 may further create reports regarding application security. Most applications show the security at a point in time. For example, if Bob is a user who changed his role from user to administrator on January $1^{st}$ and back to user on January $2^{nd}$, an auditor that reviews the security on January $3^{rd}$ would see Bob as a user and would not necessarily know that Bob temporarily changed his access to administrator. AIRE 122 may generate reports by tracking user security components and issue real-time notifications to alert auditors and interested parties on security changes so that compliance can be ensured.

Testcases, reports, and recommendations may be distributed via any suitable means such as, for example, a web report, a report that can be emailed and/or downloaded to an end user's computer or server, etc.

Figure 5:
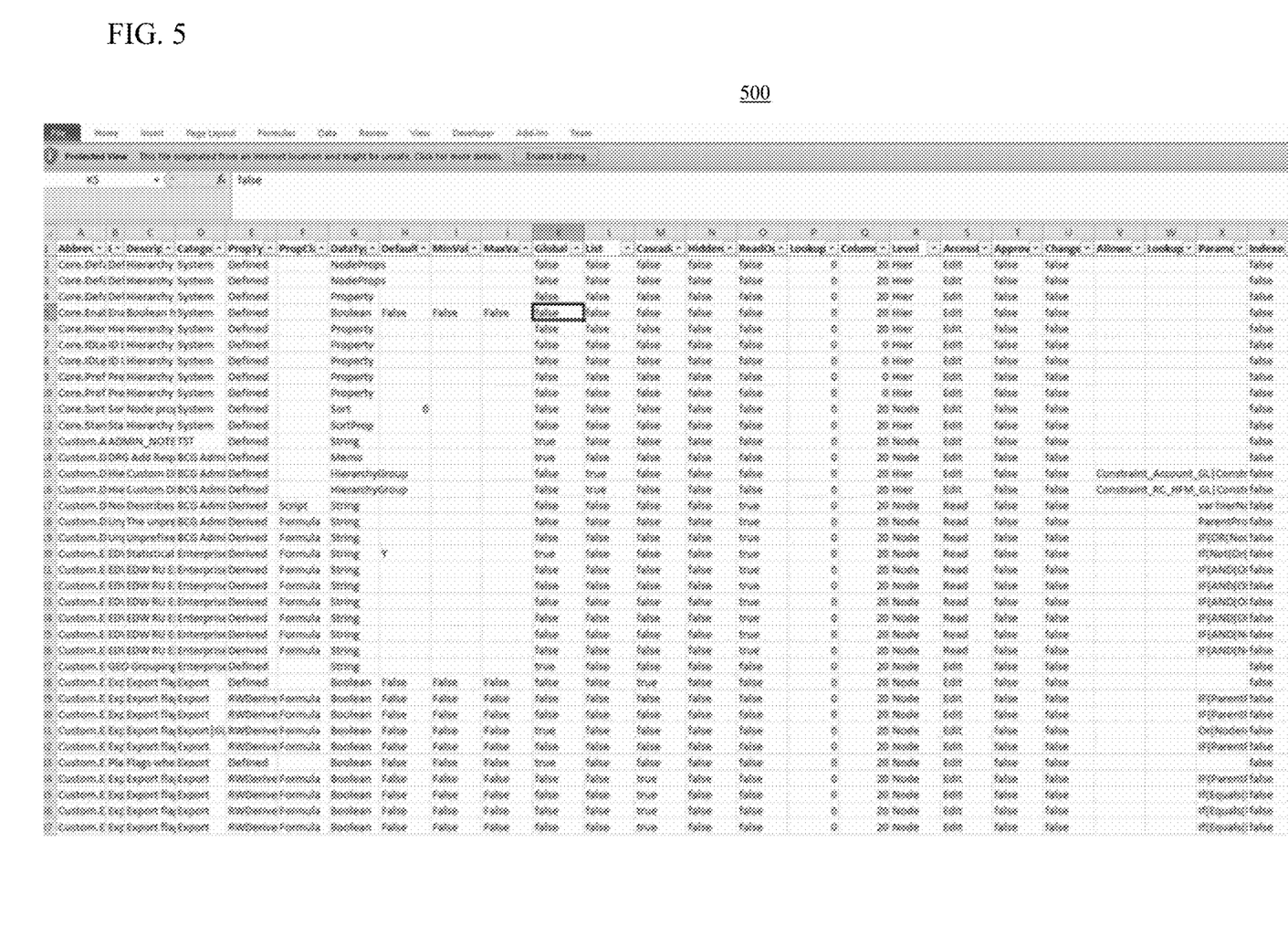
FIG. 5 shows a graphical user interface showing an inventory of properties of an enterprise application implementation, according to an example embodiment.

In particular embodiments, AIRE 122 may take the mapped components and put them in an easy-to-see format for analyzing these components. FIG. 5 shows an example graphical user interface 500 showing an inventory of properties of an enterprise application implementation, according to particular embodiments. Interface 500 shows an example of a generated inventory of properties within data management application 300. In the example shown, interface 500 lists the properties of the Property Definitions component of application 300. Inventories for each application component may be shown in separate listings. Interface 500 may further provide built-in reports to ease maintenance and understand how the system is built. While the components and properties referenced above relate to a data management application 300, AIRE 122 may be configured to handle and perform the same tasks of method 200 for any type of enterprise application.

Any organization following the Software Development Lifecycle (SDLC) may spend an extensive time testing an application. However, the test cases and test scripts are typically determined by the teams performing the build activities. The test cases may be formed by looking at the components that were built and determining what tests are needed, or referring to similar past projects. Test cases may need to be created manually, and due to time constraints components may be skipped from testing in order to meet deadlines. This can have an adverse effect on the quality of the application.

In particular embodiments, AIRE 122 creates recommended test cases based on the application components collected in its inventory. AIRE 122 may allow a user to override, modify, add, or delete test cases from the recommended tests. AIRE 122 may further generate automated programs and/or scripts to systematically run tests. AIRE 122 may further allow the user to modify the test criteria and steps. In particular embodiments, a user may indicate that modifications are finalized and accepts the tests, and AIRE 122 proceeds to create automated programs and/or scripts to execute the tests. These tests may be distributed to the end user via any suitable means such as, for example, a file download or email, and the user can execute the tests on the application.

Figure 6:
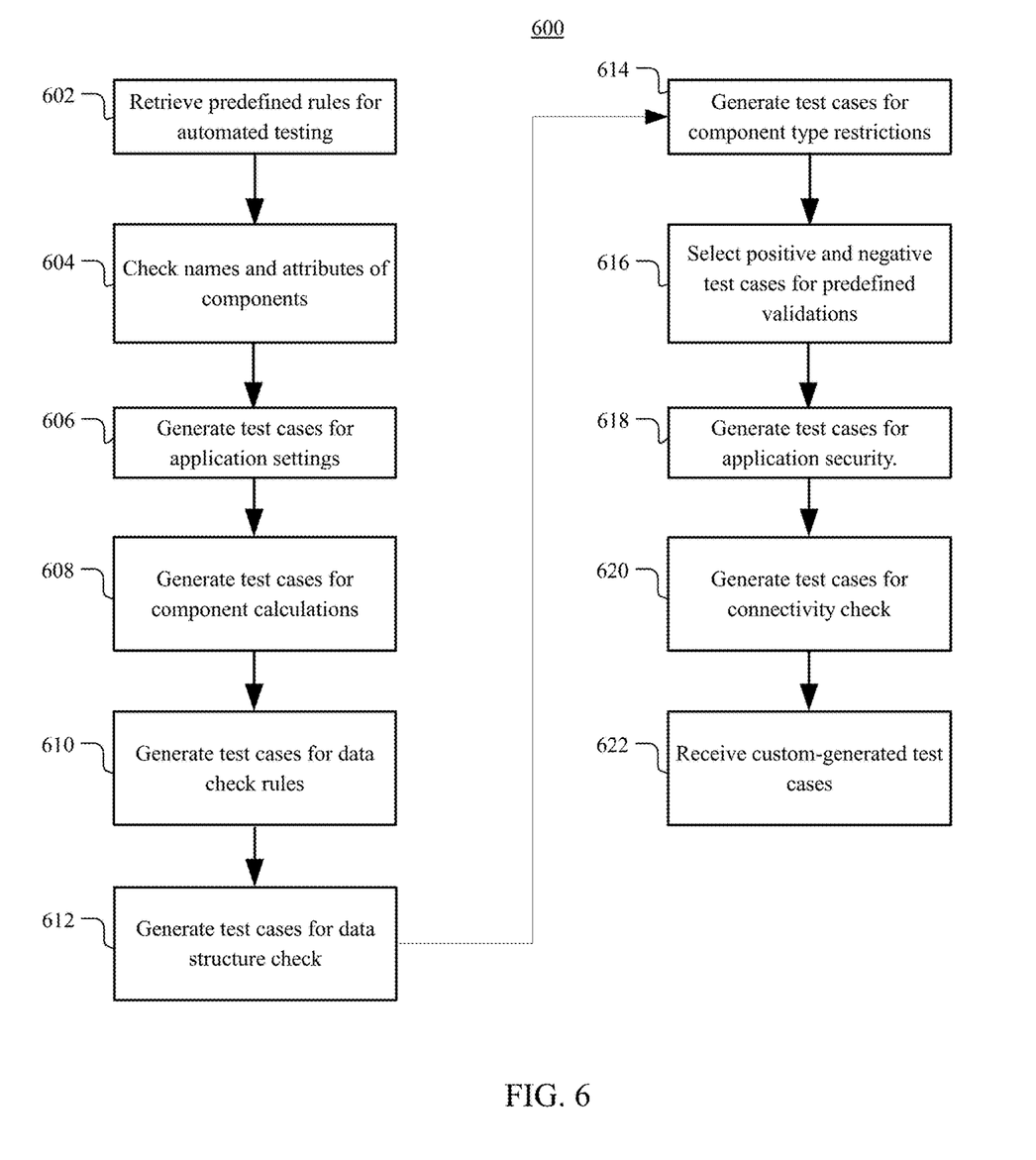
FIG. 6 shows a method for generating test cases based on rules, according to an example embodiment.

In particular embodiments, AIRE recommends test cases based on predefined business rules and user-defined business rules. As an example, predefined business rules may be created from documented application restrictions as well as leading practice implementation experience. FIG. 6 shows a method 600 for generating test cases based on rules, according to particular embodiments. At step 602, AIRE 122 retrieves one or more automated testing predefined rules. These rules may be used to generate and perform the subsequent steps.

At step 604, AIRE 122 checks the names and attributes of identified application components. For example, if components are defined to have a minimum and maximum name length, test cases are generated that check that the components meet the desired name/attribute length. In particular embodiments, positive and negative tests are generated. For example, if a component is defined to have a minimum name length of 2 and a maximum name length of 5, tests are generated to give the component a name with length of 1 (a number less than the minimum), 2 (a number meeting the minimum criteria but less than the maximum), and 6 (a number greater than the maximum). If the component is expected to already exist in the system, a test case may also be generated to ensure that the component indeed exists.

At step 606, AIRE 122 may generate one or more tests related to application settings (e.g., cache settings). Many applications allow manual cache tuning in order to improve performance. Usually, there are leading practice approaches to tuning the cache based on factors like amount of data in the application. AIRE 122 may store predefined business rules to determine what cache settings and/or other application settings should be in order to improve performance.

At step 608, AIRE 122 may generate component calculation test cases for recommendation. For example, if a user creates a custom calculation (x=5+3), a test case may be created that prompts the user for a positive test case (x=8) as well as a negative test case (x=15) in order to confirm that results are calculated as expected.

At step 610, AIRE 122 generates general data check rules test cases. Data check rules may be, for example, checking a specific cell of data for a specific amount. In another example, the data check test cases may also check the number of records in an import or export file from the application.

At step 612, AIRE 122 may generate general data structure check test cases for recommendation. For example, if a structured import or export process is expected to have a certain number of columns, a series of tests may be generated and recommended to ensure the target file has the same number of columns. In another example, if filters are applied in the import or export process, test cases for the filters may be generated and recommended. For example, if an export is created and records are filtered out based on column x being greater than 500,000, a test will be recommended for positive and negative criteria (e.g., test to ensure all records are greater than 500,000 and test to ensure no record exists with a value less than 500,000).

At step 614, AIRE 122 may generate test cases to ensure the component type restrictions are met. Components within the application may be defined to have specific types (e.g., integer value). For example, if a component is defined to accept a numeric input, positive and negative tests may be recommended. A recommended negative test would be to enter a text value "ABC" into the component to ensure that it is not accepted. A recommended positive test would be to enter a numeric input "9" into the component to ensure that it is accepted.

Many applications come with predefined validations as well as custom user-defined validations. At step 616, if the application has predefined validations AIRE 122 select positive and negative test cases for recommendation based on the validation. If application has user-defined validations, AIRE 122 may prompt a user to enter positive and negative test criteria for each validation. For example, if a user defined a field to meet specific criteria (error if value is less than 500,000), a test case will be recommended to enter a value of 1,000,000 (positive test case) and 0 (negative test case).

At step 618, AIRE 122 may generate test cases to test the integrity of the application security, for applications where security is enabled. Again, positive and negative test cases may be generated. Basic security checks may be recommended such as being able to log into the application with correct and incorrect credentials. Access to specific components or data within the application may have positive and negative test cases recommended as well. Users may be able to create custom tests for any security testing not recommended by AIRE. Application-defined security can be traced over time in order to provide compliance reporting to ensure the appropriate users have access to the data and components within the application and have the appropriate restrictions according to governing laws and regulations. For example, a user's access can be seen at a point in time or over a specific time period to ensure he/she did not have unauthorized access during that time period.

At step 620, AIRE 122 may generate connectivity check test cases. Oftentimes, applications are required to connect to file systems, databases, web services, or network components. In the event that connectivity to an external environment is defined within an application, a series of tests may be recommended to ensure connectivity to those environments exists. For example, if a component connects to a relational database, a positive test is created (username with correct password is able to connect to the database) as well as a negative test (an incorrect username/password is unable to connect to the database).

At step 622, AIRE 122 prompts users to generate custom test cases based on predefined steps and custom-created steps. Oftentimes, custom test cases are required beyond what a systematic testing module can create. For example, a user can query a specific data value and define that value must be greater than 100,000 to pass the test. Tests can be positive tests, negative tests, or both.

Figure 7:
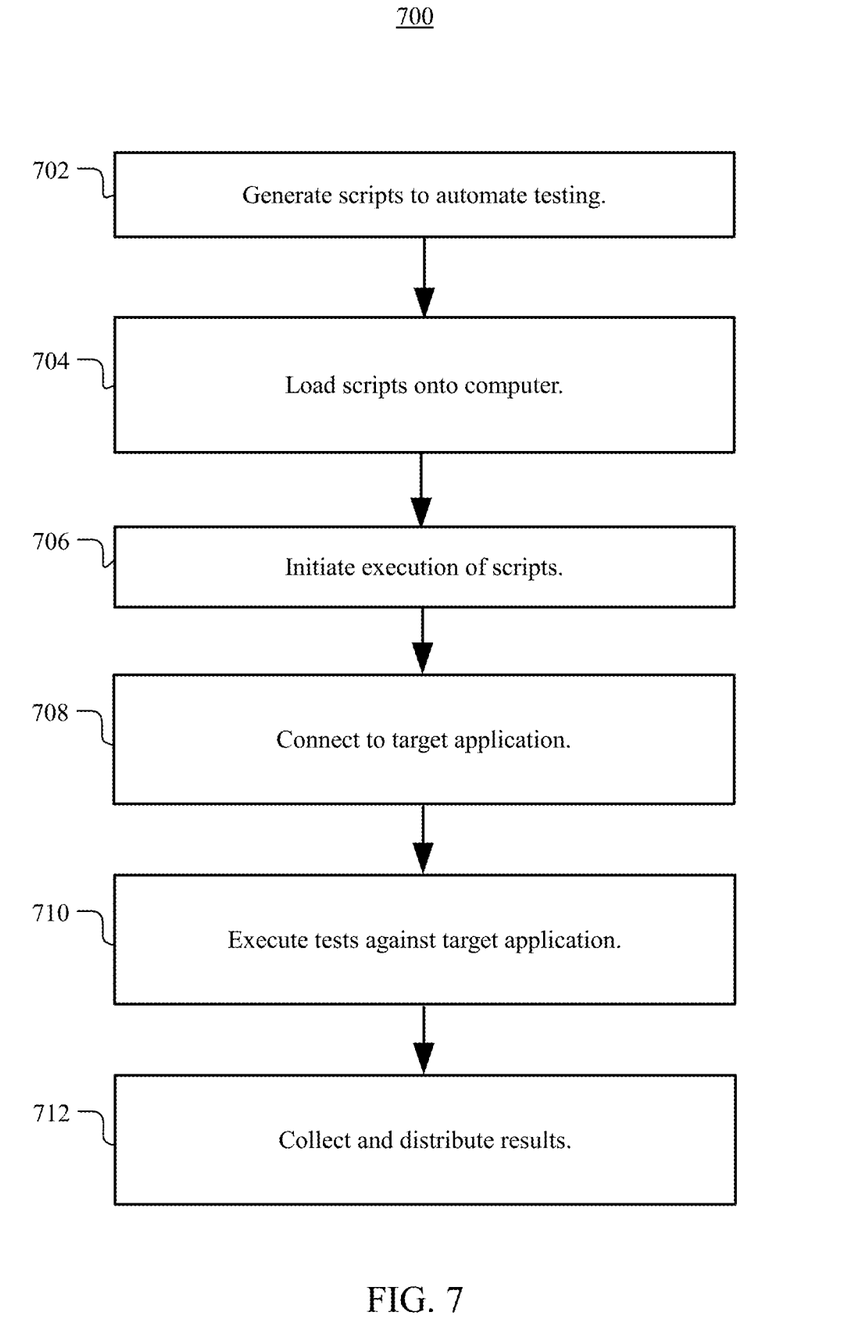
FIG. 7 shows a method of executing test cases for automated testing of enterprise applications, according to an example embodiment.

FIG. 7 shows a method of executing test cases for automated testing of enterprise applications, according to particular embodiments.

At step 702, AIRE 122 generates one or more programming scripts to automate testing the target applications, as described with reference to method 600. AIRE 122 may be configurable to create these scripts in a variety of programming languages (e.g., Python, Perl, JavaScript, etc.). These scripts can connect to the target applications through a native client interface or through an API.

At step 704, the one or more scripts generated by AIRE 122 are loaded onto a computer or server capable of connecting to the target enterprise application. At step 706, a user or program initiates the execution of the scripts. At step 708, the one or more scripts connect to the target application via a client interface or through an API. At step 710, once connected, the one or more scripts execute the series of tests against the target application. At step 712, the one or more scripts collect the results of the executed tests, store the results in a database, and distribute the test results to the end user. This distribution can be the creation/population of a file or database or an email notification with the pass/fail results of the executed tests.

Test results may break down each test into a detailed worksheet to show step-by-step test execution results, as well as a dashboard to depict overall test execution results. In addition to recommended test cases, AIRE 122 may allow users to add custom testing to the system to ensure comprehensive testing can be performed and tracked, in the event that additional testing needs to be performed in addition to the recommendations provided by AIRE.

Figure 8:
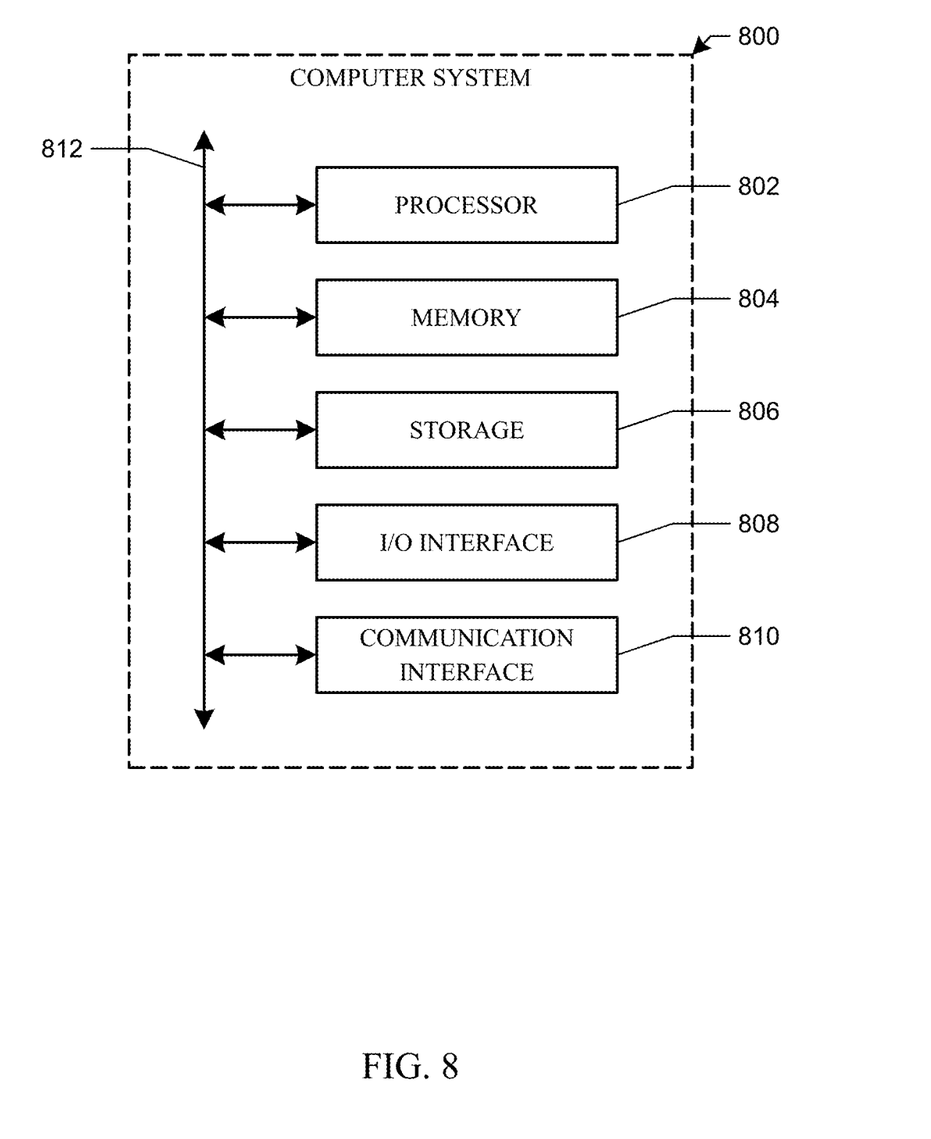
FIG. 8 is an example computer system useful for implementing various embodiments.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example, computer system 800 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, memory 804 includes random access memory (RAM). This RAM may be volatile memory, where appropriate Memory 804 may include one or more memories 804, where appropriate. Although this disclosure describes and illustrates particular memory, this disclosure contemplates any suitable memory.

In particular embodiments, storage 806 includes mass storage for data or instructions. As an example, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for managing an enterprise application implementation, the method comprising, by at least one processor:
   receiving, through a communications network, metadata associated with the enterprise application implementation, wherein the enterprise application comprises a utility to manage hierarchies, mappings, and master data for an organization;
   storing an inventory including at least a portion of the metadata and a plurality of customizable components of the enterprise application implementation, the components comprising properties created within the enterprise application, the properties including hierarchies, accounts, custom properties, and custom validations, and wherein the custom validations verify that property values meet specified criteria;
   determining, in response to a user attempting to modify one or more of the properties, one or more component dependencies of the enterprise application implementation based on the inventory, wherein a component dependency comprises a relationship that derives a property value for a first component of the plurality of customizable components based on predetermined logic applied to one or more second components of the plurality of customizable components, wherein the component dependencies comprise custom calculations;
   providing, through a user interface, one or more recommendations for component installation or deletion based on the inventory and the one or more component dependencies, wherein the one or more recommendations comprise at least one recommendation to delete a third component of the plurality of customizable components determined to not be in use and at least one recommendation to add a component to the plurality of customizable components;
   receiving a search request specifying a component name;
   providing, through the user interface, a list of one or more components having a dependency with the component specified in the search request;
   generating a report including changes to one or more of the customizable components over a specified period of time;
   issuing a real-time notification that a security component of the one or more customizable components has been changed;
   automatically generating one or more testcases based on the inventory and the one or more component dependencies, the generating comprising generating automated programs and scripts to run the one or more testcases;
   generating one or more recommendations for test cases based on predefined business rules and user-defined rules and further based on the determined one or more component dependencies, the generating the recommendations comprising:
      retrieving one or more automated testing predefined rules, the rules comprising a plurality of names and attributes of application components to be tested, generating one or more positive and negative test cases checking that the plurality of names and attributes for the application components to be tested meet desired values, generating one or more test cases related to cache settings based on a determined amount of data in the application, generating one or more test cases for data structure checks of a structured import and export process, generating one or more test cases for ensure that component data type restrictions are met, generating one or more test cases for testing an integrity of application security of the enterprise application implementation comprising security checks for logging into the enterprise application implementation with correct and incorrect credentials, and generating one or more test cases for testing connectivity comprising at least a check to ensure that connectivity to a web service exists;

receiving, through the user interface, one or more custom test cases comprising one or more steps that test whether a specific data value associated with at least one of the one or more components or component dependencies meet specified criteria;

executing one or more scripts associated with one or more of the generated test cases and one or more of the recommended test cases, wherein the one or more scripts connect to the enterprise application implementation; and storing the results of the executing the one or more scripts.

2. The method of claim 1, wherein receiving the metadata comprises receiving the metadata through a network transmission in response to an Application Programming Interface (API) call.

3. A system, comprising:

a memory; and at least one processor coupled to the memory and configured to:

receive, through a communications network, metadata associated with the enterprise application implementation, wherein the enterprise application comprises a utility to manage hierarchies, mappings, and master data for an organization;

store an inventory including at least a portion of the metadata and a plurality of customizable components of the enterprise application implementation, the components comprising properties created within the enterprise application, the properties including hierarchies, accounts, custom properties, and custom validations, and wherein the custom validations verify that property values meet specified criteria;

determine, in response to a user attempting to modify one or more of the properties, one or more component dependencies of the enterprise application implementation based on the inventory, wherein a component dependency comprises a relationship that derives a property value for a first component of the plurality of customizable components based on predetermined logic applied to one or more second components of the plurality of customizable components, wherein the component dependencies comprise custom calculations;

provide, through a user interface, one or more recommendations for component installation or deletion based on the inventory and the one or more component dependencies, wherein the one or more recommendations comprise at least one recommendation to delete a third component of the plurality of customizable components determined to not be in use and at least one recommendation to add a component to the plurality of customizable components;

receive a search request specifying a component name;

provide, through the user interface, a list of one or more components having a dependency with the component specified in the search request;

generate a report including changes to one or more of the customizable components over a specified period of time;

issue a real-time notification that a security component of the one or more customizable components has been changed;

automatically generating one or more testcases based on the inventory and the one or more component dependencies, the generating comprising generating automated programs and scripts to run the one or more testcases;

generate one or more recommendations for test cases based on predefined business rules and user-defined rules and further based on the determined one or more component dependencies, the generating the recommendations comprising:

retrieve one or more automated testing predefined rules, the rules comprising a plurality of names and attributes of application components to be tested, generate one or more positive and negative test cases checking that the plurality of names and attributes for the application components to be tested meet desired values, generate one or more test cases related to cache settings based on a determined amount of data in the application, generate one or more test cases for data structure checks of a structured import and export process, generate one or more test cases for ensure that component data type restrictions are met, generate one or more test cases for testing an integrity of application security of the enterprise application implementation comprising security checks for logging into the enterprise application implementation with correct and incorrect credentials, and generate one or more test cases for testing connectivity comprising at least a check to ensure that connectivity to a web service exists;

receive, through the user interface, one or more custom test cases comprising one or more steps that test whether a specific data value associated with at least one of the one or more components or component dependencies meet specified criteria;

execute one or more scripts associated with one or more of the generated test cases and one or more of the recommended test cases, wherein the one or more scripts connect to the enterprise application implementation; and store the results of the executing the one or more scripts.

4. The system of claim 3, wherein to receive the metadata the at least one processor is configured to receive the metadata through a network transmission in response to an Application Programming Interface (API) call.

5. A non-transitory computer-readable device having instructions stored thereon that, when executed by at least one computing device, causes the at least one computing device to perform operations comprising:

receiving, through a communications network, metadata associated with the enterprise application implementation, wherein the enterprise application comprises a utility to manage hierarchies, mappings, and master data for an organization;

storing an inventory including at least a portion of the metadata and a plurality of customizable components of the enterprise application implementation, the components comprising properties created within the enterprise application, the properties including hierarchies, accounts, custom properties, and custom validations, and wherein the custom validations verify that property values meet specified criteria;

determining, in response to a user attempting to modify one or more of the properties, one or more component dependencies of the enterprise application implementation based on the inventory, wherein a component dependency comprises a relationship that assigns derives a property value for a first component of the plurality of customizable components based on predetermined logic applied to one or more second components of the plurality of customizable components, wherein the component dependencies comprise custom calculations;

providing, through a user interface, one or more recommendations for component installation or deletion based on the inventory and the one or more component dependencies, wherein the one or more recommendations comprise at least one recommendation to delete a third component of the plurality of customizable components determined to not be in use and at least one recommendation to add a component to the plurality of customizable components;

receiving a search request specifying a component name;

providing, through the user interface, a list of one or more components having a dependency with the component specified in the search request;

generating a report including changes to one or more of the customizable components over a specified period of time;

issuing a real-time notification that a security component of the one or more customizable components has been changed;

automatically generating one or more testcases based on the inventory and the one or more component dependencies, the generating comprising generating automated programs and scripts to run the one or more testcases;

generating one or more recommendations for test cases based on predefined business rules and user-defined rules and further based on the determined one or more component dependencies, the generating the recommendations comprising:

retrieving one or more automated testing predefined rules, the rules comprising a plurality of names and attributes of application components to be tested, generating one or more positive and negative test cases checking that the plurality of names and attributes for the application components to be tested meet desired values, generating one or more test cases related to cache settings based on a determined amount of data in the application, generating one or more test cases for data structure checks of a structured import and export process, generating one or more test cases for ensure that component data type restrictions are met, generating one or more test cases for testing an integrity of application security of the enterprise application implementation comprising security checks for logging into the enterprise application implementation with correct and incorrect credentials, and generating one or more test cases for testing connectivity comprising at least a check to ensure that connectivity to a web service exists;

receiving, through the user interface, one or more custom test cases comprising one or more steps that test whether a specific data value associated with at least one of the one or more components or component dependencies meet specified criteria;

executing one or more scripts associated with one or more of the generated test cases and one or more of the recommended test cases, wherein the one or more scripts connect to the enterprise application implementation; and storing the results of the executing the one or more scripts.

6. The computer-readable device of claim 5, wherein receiving the metadata comprises receiving the metadata through a network transmission in response to an Application Programming Interface (API) call.

* * * * *